(12) United States Patent
Frade et al.

(10) Patent No.: US 12,536,236 B2
(45) Date of Patent: Jan. 27, 2026

(54) SYSTEMS AND METHODS FOR GENERATING DOCUMENT FORMATTING AND CONTENT USING GENERATIVE AI

(71) Applicant: JPMORGAN CHASE BANK, N.A., New York, NY (US)

(72) Inventors: Andre Frade, London (GB); Marcus Kaiser, London (GB); Maxime Labonne, London (GB); Sean Moran, London (GB); Jack Donnelly, Rye, NY (US); Daniel Roose, London (GB); Babak Khorshidi, Surrey (GB); Lily Mcinerney, Hoboken, NJ (US); Jacob Marold, Pound Ridge, NY (US); Harshavardhan Vemulapati, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 19/015,318

(22) Filed: Jan. 9, 2025

(65) Prior Publication Data
US 2025/0225188 A1    Jul. 10, 2025

Related U.S. Application Data

(60) Provisional application No. 63/619,177, filed on Jan. 9, 2024.

(51) Int. Cl.
*G06F 16/93* (2019.01)
(52) U.S. Cl.
CPC ................ *G06F 16/93* (2019.01)

(58) Field of Classification Search
CPC .................................................. G06F 16/93
USPC ........................................................ 707/695
See application file for complete search history.

(56) References Cited

U.S. PATENT DOCUMENTS

| | | | |
|---|---|---|---|
| 12,417,214 B1* | 9/2025 | Zhang | G06F 40/205 |
| 2004/0268246 A1* | 12/2004 | Leban | H04L 51/066 |
| | | | 715/239 |
| 2023/0315993 A1* | 10/2023 | Nieborowski | G06F 16/35 |
| | | | 704/9 |

FOREIGN PATENT DOCUMENTS

| | | | | |
|---|---|---|---|---|
| CN | 112380827 B | * | 10/2022 | G06F 40/186 |

* cited by examiner

*Primary Examiner* — Kuen S Lu
(74) *Attorney, Agent, or Firm* — GREENBERG TRAURIG LLP (57) ABSTRACT

Systems and methods for providing an archive of precedents are provided. The archive of precedents includes determining precedent data; parsing a new-event XML file for string data, wherein the string data is related to a new event; generating a vector embedding from the string data; determining a similar embedding in a vector space, wherein the similar embedding is a vector embedding of an instance of precedent data; parsing XML files of the precedent and new event and using parsed data to generate an old-to-new value map; retrieving the corresponding XML file and the corresponding precedent-event document associated with the vector embedding of the instance of precedent data; and providing, as input to a natural language processing model, the list of text strings recovered from the editable form of the document of the precedent event and the old-to-new value map.

13 Claims, 7 Drawing Sheets

New deal term sheet:

../data/test_pair/3P 2994 SPXD8UE PPN Prelim PS (48133X2X5)_20230310019021505GTER74695.pdf Rank of precedent candidates

| | distance | date | cusip | candidate_template |
|---|---|---|---|---|
| 0 | 0.023485 | 2023-08-28 | 48133X2X3 | ./data/termsheets/3P 3599 SPXD8UE PPN Prelim PS (48133X2X3)_20230307162629131TER13885.PDF |
| 1 | 0.023485 | 2023-08-28 | 48133XJC1 | ./data/termsheets/3P 3064 SPXD8UE PPN Prelim PS (48133XJC1)_202301061901194TER28577.PDF |
| 2 | 0.098820 | 2023-08-28 | 48139VPK0 | ./data/termsheets/3P 1752 SPAD8UE PPN Prelim PS (48139VPK0)_20230204183516172TER20284.PDF |
| 3 | 0.102780 | 2023-08-28 | 48133XJB3 | ./data/termsheets/3P 3063 SPXTSUE PPN Prelim PS (48133XJB3)_20230106204131764TER24076.PDF |
| 4 | 0.134953 | 2023-08-28 | 48133VC99 | ./data/termsheets/SPXTSUE PPN Prelim PS (48133VC99)_20230404144535891TER16471.pdf |

SYSTEMS AND METHODS FOR GENERATING DOCUMENT FORMATTING AND CONTENT USING GENERATIVE AI

FIELD OF THE DISCLOSURE

Embodiments of this disclosure generally relate to systems and methods for generating document formatting and content.

BACKGROUND

Electronic document generation is prolific in commerce. In many business environments, generation of documentation related to business undertakings can be highly resource intensive. Many times, business documentation is mandated by either governmental institutions or by an organization's own operational policies and best practices. This poses a challenge to organizations with respect to scalability, efficiency, time to market, etc. Many documents can follow a logical template with respect to formatting, categorical content, and arrangement of content. Nevertheless, conventional document automation processes often do little to reduce resources needed to generate compliant documents for business interactions.

Thousands of structured transactions take place every week across global markets. It is often a regulatory requirement that each transaction is issued together with documentation describing the characteristics of a business deal or business event (referred to herein as an "event"), as well as its terms and conditions. For instance, for structured investments this will typically include a preliminary documentation and final pricing documentation or disclosure supplement. The generation of both document versions is a considerable part of the deal event, and often requires a large amount of time and resources. Additionally, document generation processes available at the present time may introduce inaccuracies which may pose a challenge to scalability and time to market for new deals. There is thus a need for systems that eliminate errors, are scalable, and that allow for efficient document production and review.

SUMMARY

In some embodiments, the techniques described herein relate to a method including: providing an archive of precedents (past deals), wherein the archive of precedents includes, for each of a plurality of events, precedent data, and wherein the precedent data for each of the plurality of events includes a corresponding extensible markup language (XML) file and a corresponding precedent-event document, and each corresponding to a distinct representations or a set of distinct representations of precedent event(s); parsing a new-event XML file for string data, wherein the string data is related to a new event; generating a vector embedding or graph representation from the string data; determining a similar embedding in a vector space using a cross encoder that ranks the similar embedding to the generated vector, wherein the similar embedding is a vector embedding or graph representation of an instance of precedent data; parsing XML files of the precedent and new event and using parsed data to generate an old-to-new value map; retrieving the corresponding XML file and the corresponding precedent-event document associated with the vector embedding of the instance of precedent data; providing, as input to a natural language processing model, the list of text strings recovered from the editable form of the document (i.e., open xml of word docx) of the precedent event and the old-to-new value maps; and receiving, from the natural language processing model, a modified version of the corresponding XML file and a modified version of the corresponding precedent-event document, wherein the modified version of the corresponding XML file and the modified version of the corresponding precedent-event document, are modified by the natural language processing model by inclusion of the element replacement values according to the old-to-new value maps.

In some embodiments, the techniques described herein relate to a method, including: saving the modified version of the corresponding XML file and the modified version of the corresponding precedent-event document as a new XML file and a new event document, respectively. In some embodiments, the techniques described herein relate to a method, including: adding the new XML file and the new precedent-event document as precedent data to the archive of precedents. In some embodiments, the techniques described herein relate to a method, wherein the element replacement values include a text element update. In some embodiments, the techniques described herein relate to a method, wherein the element replacement values include a table element update. In some embodiments, the techniques described herein relate to a method, wherein the element replacement values include an illustration element update.

In some embodiments, the techniques described herein relate to a method, including: providing, by a database manager executed by one or more processors, an archive of precedents, wherein the archive of precedents includes, for each of a plurality of events, precedent data, and wherein the precedent data for each of the plurality of events includes a corresponding open-format file and a corresponding precedent-event document, and each corresponding to a distinct representation of a precedent event; parsing, by an overwriting application executed by one or more processors, a new-event open-format file for string data, wherein the string data is related to a new event; generating, by the overwriting application, a vector embedding from the string data; determining, by the overwriting application, a similar embedding in a vector space using a cosine distance or an output of a cross encoder model wherein the similar embedding is a vector embedding or representation of an instance of precedent data; parsing, by the overwriting application, open-format files of the precedent and new event and using parsed data to generate an old-to-new value map; retrieving, by the overwriting application, the corresponding open-format file and the corresponding precedent-event document(s) associated with the vector embedding of the instance of precedent data; providing, by the overwriting application, as input to a natural language processing model, the list of text strings recovered from the editable form of the document of the precedent event and the old-to-new value map; modifying, by the natural language processing model executed by one or more processors, the corresponding open-format file and the corresponding precedent-event document by including element replacement values according to the old-to-new value maps, and receiving, by a user interface through the overwriting application and from the natural language processing model, a modified version of the corresponding open-format file and a modified version of the corresponding precedent-event document.

BRIEF DESCRIPTION OF THE DRAWINGS

The accompanying drawings illustrate one or more embodiments and/or Embodiments of the disclosure and, together with the written description, serve to explain the principles of the disclosure. Wherever possible, the same reference numbers are used throughout the drawings to refer to the same or like elements of an embodiment, and wherein.

Before explaining the embodiments of the present disclosure in detail, it is to be understood that the invention is not limited in its application to the details of the particular arrangement shown, since the invention is capable of other embodiments. Example embodiments are illustrated in the referenced figures of the drawings. It is intended that the embodiments and figures disclosed herein are to be considered illustrative rather than limiting.

DETAILED DESCRIPTION

Although this disclosure is susceptible of embodiments in many different forms, there are shown in the drawings and are described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in desired combinations, for the operation of the invention in its various embodiments. Features from one embodiment can be used in other embodiments.

Also, the terminology used herein is for the purpose of description and not of limitation. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As shown in the figures, Embodiments of this disclosure generally relate to systems and methods for generating document formatting and content.

Conventional document generation may happen in several ways, which primarily fall into three main categories at the present time:

1) Automatic deal document generation, where deal representations are fed to document templating systems onto which the deal has been onboarded, i.e., a legally approved document template exists for that specific deal type. It is conditional on the existence of a template for the new incoming deal. Each template consists of complex carefully crafted logic. Such logic must be implemented by template engineers. Templates are tailored to specific deal types and cannot be repurposed. The template solution requires expert knowledge, it is expensive, time consuming, and hard to scale. Ongoing template maintenance is required for any changes to applicable disclosures or issuance program updates.

2) Semi-automatic channel, where Embodiments of the document are systematically generated, but this requires manual intervention to complete and finalize. Requires the manual identification of the suitable precedent. Requires the manual editing of the document in a formatting or deal term capacity. Requires expert knowledge, it is expensive and time consuming. Variability in the success rate of semi-automated Embodiments of the document.

3) Manual channel, where deal representations are passed onto dedicated and often external legal teams that draft documents from scratch or historic manual templates. This is extremely expensive, error-prone, and time consuming. It is conditional on the existence of a past deal (precedent) that is similar enough to the incoming deal, such that its documentation can be appropriately reused through minimal editing. It may require a new template to be created based on new pay-out profile or structure. It may also require additional time dedicated to review of disclosures for new reference asset or payoff structure.

Thousands of structured transactions take place every week across global markets. It is often a regulatory requirement that each transaction is issued together with documentation describing the characteristics of a business deal or business event (referred to herein as an "event"), as well as its terms and conditions. For instance, for structured investments this will typically include a preliminary documentation and final pricing documentation or disclosure supplement. The generation of both document versions is a considerable part of the deal event, and often requires a large amount of time and resources. Additionally, document generation processes available at the present time may introduce inaccuracies which may pose a challenge to scalability and time to market for new deals.

Embodiments of this disclosure may include providing a precedent-dependent document generation tool/process for the automated generation of organizational documents. The embodiments may include a precedent term sheet document identification strategy, using sentence transformers as described below. The embodiments may further include providing a precedent term sheet document overwriting process that uses a standardized and open file format. The embodiments may further include the use of natural language processing (NLP) based technologies, including NLP-based machine learning models such as large language models (LLMs) as described below. A standardized and open file format may be defined for archiving of word processing documents, spreadsheets, and other office productivity applications. A standardized and open file format may be XML based. A standardized and open file format may use compression such as ZIP compression. Some standardized and open XML file formats include Microsoft® Office® Open XML and Open Document Format (ODF). A standardized and open file format may be based on other structured data representations/formats such as Java Script Object Notation (JSON). As used herein, the term "open-format file" refers to a file having a standardized open file format as described above.

In an embodiment, transactions may be priced and managed via internal deal management/execution systems at an organization. These systems are able to output data files that encapsulate details of the issued transaction (i.e., an exemplary event)—data and metadata—in various formats (e.g., JSON, XML). Such deal (event) representations can then be utilized at appropriate channels for the generation of the corresponding documentation.

The embodiments may utilize a dependency and an input in automated document generation. The dependency may include an archive of precedents. The input may include an open-format file representation of a new event such as an incoming business deal. A precedent dependent term sheet generation tool relies (i.e., has a dependency) on the existence of an archive of past deals. Each deal in the archive must be represented by a corresponding open-format file and term sheet document (which may be a natural language text document in, e.g., a portable document format (PDF), .DocX, etc.). An archive of precedents may include a number of past related documents, where each document is represented by one open-format file and one term sheet document. A term sheet document may include PDF documents and word processor formatted documents and may also include elements such as tables and illustrations, etc., which may also be within scope for updating. A term sheet document may also be referred to herein as a precedent-event document.

The diversity of the archive is one of the key factors with respect to the performance and scalability of the tool/process. Note that term sheets of past deals are used as templates for the preparation of new deal documentation. Also, the closer a precedent is from the new event, the fewer changes will be required to convert old term sheets into new ones. Identifying and reusing manually drafted and approved templates that require minimal AI powered changes helps minimize the input from an NLP technique or model (such as an LLM), hence decreasing the risk of hallucination.

Once a new document type is identified for generation (based on, e.g., a new event), an open-format file representation of it is produced. This open-format file is the key input of the precedent-dependent term sheets generation tool, which operates in a 2 step-wise approach: 1) precedent identification, and 2) precedent overwriting.

Figure 1:
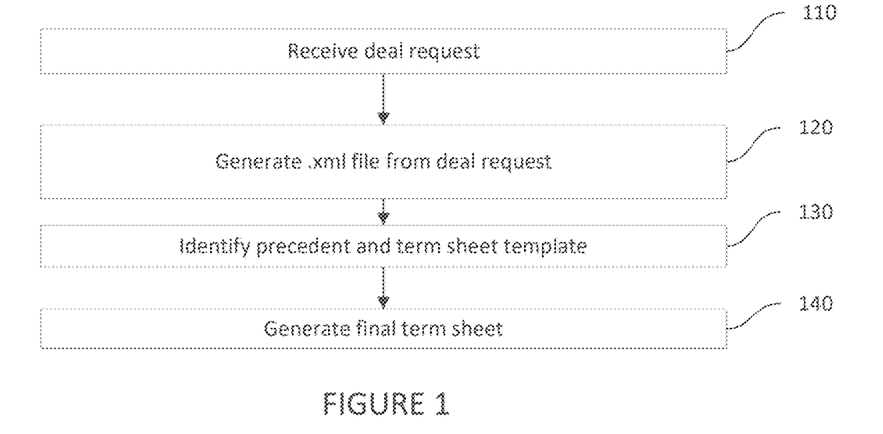
FIG. 1 illustrates a logical overview of a method for generating document formatting and content, according to an embodiment.

Referring to FIG. 1, a logical overview of a method for generating document formatting and content according to some embodiments is illustrated.

At step 110, a user interface executed by one or more processors (e.g. by a user electronic device), may receive a deal request. The deal request may be in the format of a text document, a chat entry, or a form (with one or more entries).

At step 120, a overwriting application executed by one or more processors, may generate a XML file (i.e., a plain text file that uses extensible markup language (XML) to encode documents in a format that is both human-readable and machine-readable) from the deal request received from the user interface. The deal request may trigger an API call with the deal request information to a network, computer, or server executing the overwriting application that will respond with a transformed deal as disclosed further herein. The conversion to XML may accelerate comparison with existing deal entries.

At step 130, the overwriting application, may identify a precedent and a term sheet template. During precedent identification, details of a new event are compared against an archive of past event details. The aim is to identify the most similar past event, assess its relevance (similarity) for the new case, and if relevant, retrieve its corresponding documentation. Data may be retrieved from the open-format file associated with a past event based on a set list of XML tags. During this stage, the following steps are carried out: 1) parse the open-format file of the new deal for information that describes the type of deal being processed, wherein tags may be retrieved as string values; 2) embed the XML information for precedent identification; and 3) perform precedent identification.

Identified precedent term sheets may generally serve as a good starting point for document generation, since most structure, content, and formatting should already be in place. In a second phase, these templates are updated with the specifics of a new event.

At step 140, the overwriting application may generate a final term sheet may generate the XML of the deal request and the identified precedent and term sheet template. The overwriting application may communicate with the user interface to provide a list of changed terms, sections, dates, or similar, a highlighted form of the final term sheet with edited terms, sections, dates, or similar, In some embodiments, the overwriting application may accept an instruction from the user interface to apply all edits and simultaneously authorize and/or execute the new deal according to the final term sheet. In some embodiments, the new deal may be executed by generating instructions according to the final term sheet such as writing to a distributed ledger (e.g., such as blockchain) according to the final term sheet or holding, blocking, or allowing a transaction according to the final term sheet (e.g., if a term is met, not met, or needs more information or verification).

Figure 2:
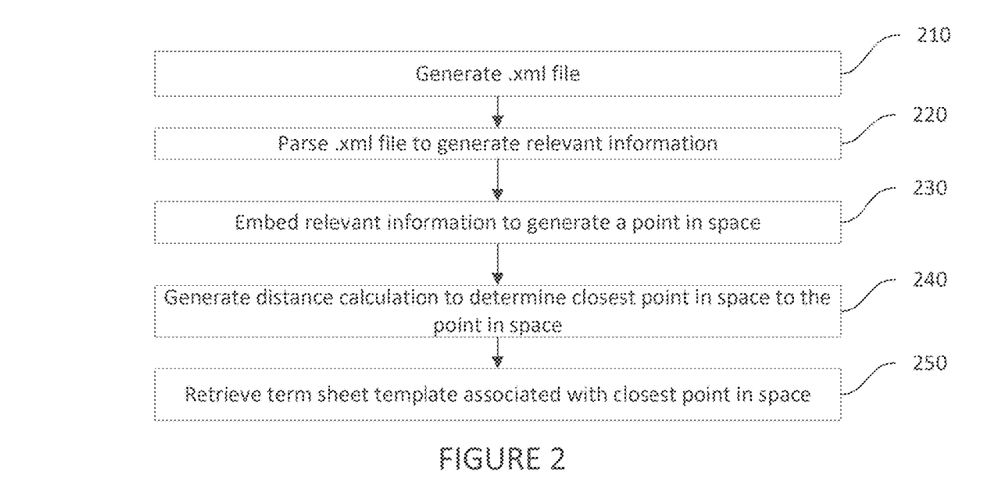
FIG. 2 illustrates a logical overview of a precedent identification process, according to an embodiment.

FIG. 2 illustrates a logical overview of a precedent identification process, according to some embodiments.

At step 210, an overwriting application executed by one or more processors may generate a XML file (e.g., from a deal request, from a deal document).

At step 220, the overwriting application may parse the XML into an open-format file of the new deal for information that describes the type of deal being processed.

At step 230, an overwriting application may calculate may embed the XML information. Tags may be retrieved as string values XML information may be embedded as a vector or graph representation of the information. All identified string values from an XML file may be concatenated into a single string. The single string is embedded using a sentence transformer, converting it into a list of numbers, where the list of numbers represents a point in space. Embeddings from documents generated for related or similar events may also be included in the space and a similarity measurement (e.g., cosine distance or cross encoder) may be made to determine one or more related embeddings that are relatively close to the XML information embedding.

At step 240, the overwriting application may calculate a distance calculation, using a cosine distance or a cross encoder to predict relative distances for example, may be calculated to determine a closest point in space to the embedded XML information of the new deal. The assumption is that points in space that are close to each other represent similar information, which in this case refers to the business deal or event type. The cross encoder may trained on historical XMLs to predict the Word error rate (WER) between a candidate precedent (e.g., the closest point in space) and the new deal. The WER metric represents a number of edits to be made to the precedent term sheet to result in the historical new deal, which acts as a proxy to train the cross encoder to predict candidate precedent XMLs which are closer to the new deal. The cross encoder may be a machine learning model trained to recognize a pattern based on the WER of a candidate precedent. The cross encoder model may classify data pairs. The cross encoder may accept a data pair as an input and output a value indicating a similarity between the data pair.

At step 250, an overwriting application may associate a term sheet template with the closest precedent and may retrieve the closest precedent from a memory. The retrieved term sheet template may be used with the existing deal request details to form a final term sheet.

Figure 3:
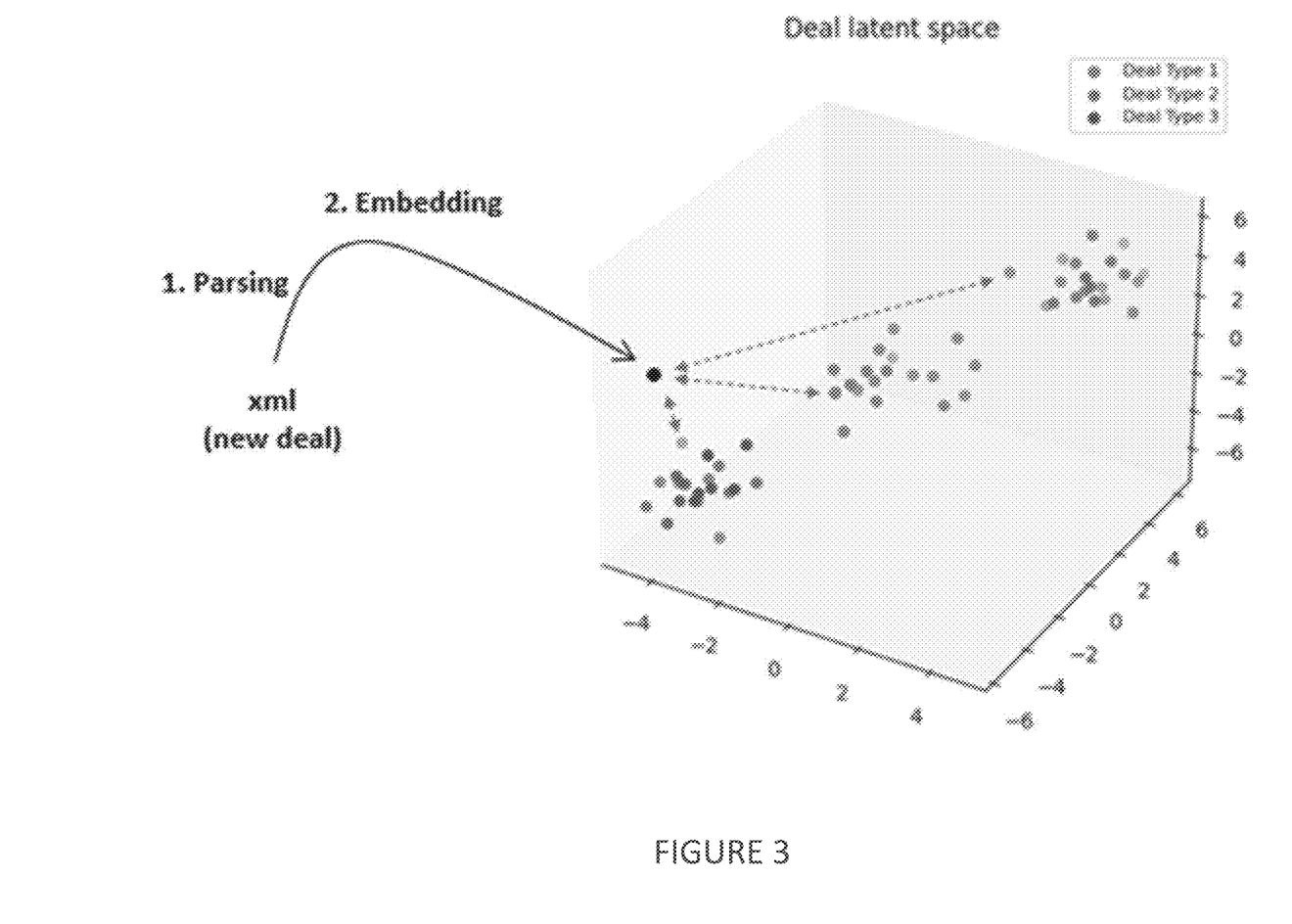
FIG. 3 illustrates a diagram of a document vector embedding, according to an embodiment.

FIG. 3 illustrates a diagram of a document vector embedding, according to some embodiments.

The document vector embedding may be performed by an overwriting application. In some embodiments, deals or events in the archive have gone through the same vectorization stages described above, meaning that they too are represented as an embedding or point in space. The distance between the new deal's embedding and each deal embedding in the archive of precedents is calculated (e.g., using cosine distance, cross encoder). The closest archive embedding may be identified as the best precedent candidate(s), and its corresponding documentation(s) (e.g., term sheet PDF, .DocX) is retrieved. A threshold may be applied to the distance calculation, ensuring that identified precedent information meet the similarity standards required for document generation to be successful.

As an example, a parsing of the new deal may be graphed and may subsequently be found to be closer to a deal type 3 than a deal type 2 or a teal type 1. Deal types 1, 2, and 3 may be user-identified deal documents (e.g., precedents) that are vectorized as described herein.

Figure 4:
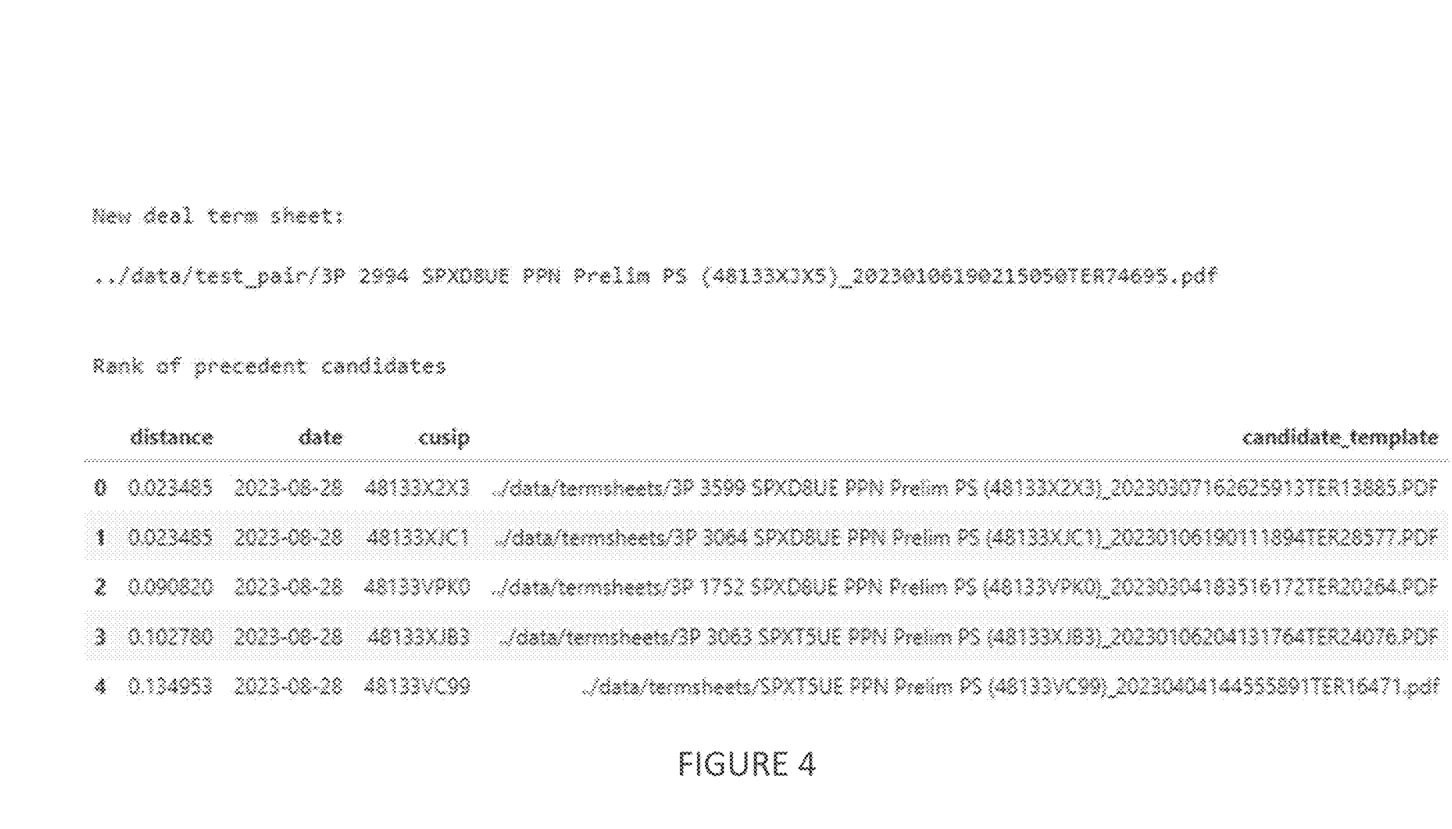
FIG. 4 illustrates a table showing ranks of embeddings of precedent candidates based on a similarity measurement with respect to a subject embedding, according to an embodiment.

FIG. 4 illustrates a table showing ranks of embeddings of precedent candidates based on a similarity measurement with respect to a subject embedding, according to some embodiments.

In some embodiments, precedent overwriting may be implemented by an overwriting application in document generation. During precedent overwriting, term sheet templates are overwritten with the specifics of a new deal or event. Three distinct elements exist for updating-text, tables, and illustrations. As used herein, an illustration may be any visual presentation captured in a document that is not solely text or arranged in a table format. Some illustrations include drawings, figures, graphics, charts, pictures, images, presentations, etc. Each element must be dealt with in an appropriate way corresponding to the deal parameters specified in the structured representation, and may involve population of figure illustrations and tables via an API service which accepts the structured deal parameters and returns a completed figure illustration or table. The entire manipulation is applied to the open-format file and filing system of the unzipped version of a word processor document file of the term sheet template (e.g., a Microsoft® Word® document file having, e.g., a .docx file extension/format). This ensures that the new updates can absorb the original document formatting, styling, and structure.

In some embodiments, a precedent ranker model executed by one or more processors may rank embeddings. The precedent ranker model may be a machine learning model. The machine learning model may be trained based on word-to error rate historical examples. The ranker may be trained using the word-error-rate (WER) metric to objectively quantify the amount of missing edits per insertions in ideal re-written text. The metric allows for an objective "oracle" ideal precedent given a comparison across past examples. The WER metric is useful to include as a separate evaluation step in the methods to provide another objective metric. The WER metric ensures consistency and system performance over time, although a variety of different files, formats, and/or errors may be analyzed.

During precedent overwriting, the following steps may be carried out: 1) Conversion of the precedent term sheet PDF into word processor format, and access to the unzipped version of the document; 2) a text elements update; 3) a table elements update; and 4) an illustration elements update. Upon text, tables, and illustration update completion, the unzipped version of the term sheet document is converted back into word processor format. A word processor format may be used due to the ability to manipulate text within the format and to ensure that the final generated document has the updated content in the correct format and style. In some Embodiments, word processor versions of precedent term sheets may be made available from the archive. In this scenario, the noted conversion step may not be executed.

When the pipeline runs end to end and the final word processor document file opens without errors, the precedent identification and overwriting can be considered successful, and the document is ready for a manual review.

Figure 5:
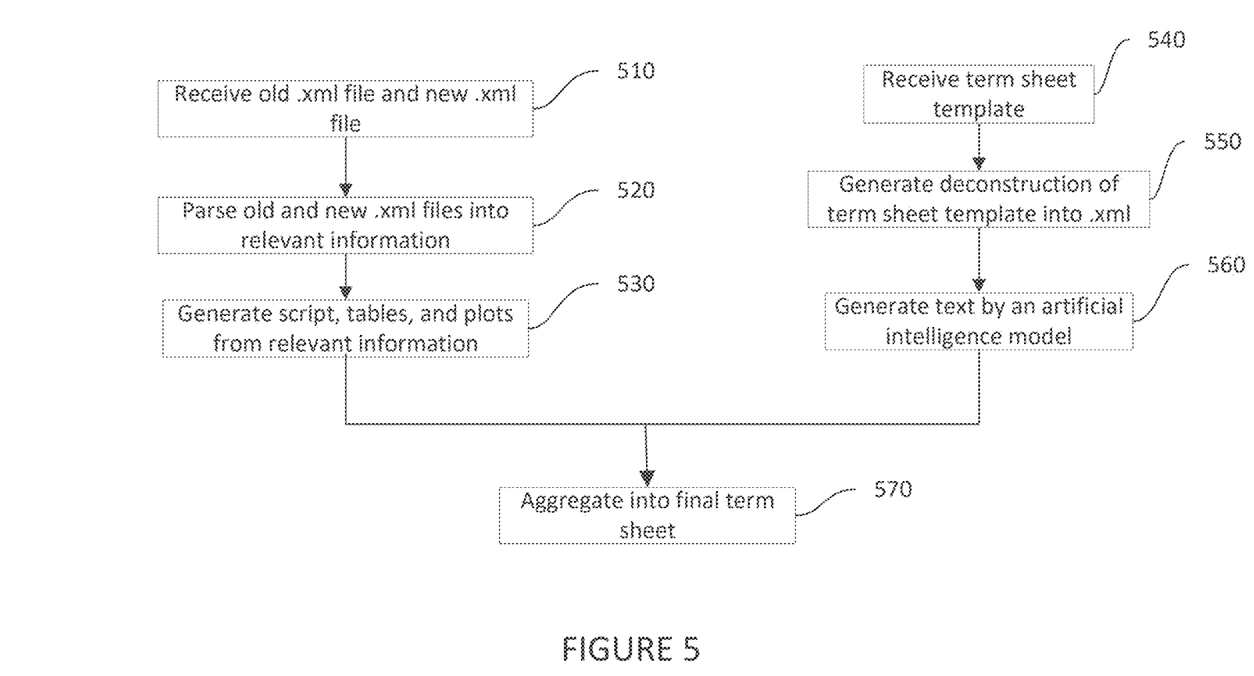
FIG. 5 illustrates a logical overview of a precedent document overwriting process, according to an embodiment.

FIG. 5 illustrates a logical overview of a precedent document overwriting process, according to some embodiments.

The process may include performing text element updates.

In step 510, old XML and new XML files may be received by a user interface and communicated by the user interface to a overwriting application executed by one or more processors.

In step 520, the overwriting application may parse the old and new XML files into relevant information.

In step 530, the overwriting application may parse may generate a script, a table, and/or a plot from the relevant information. In some embodiments, each parsed file may be used to generate the script, the table, and/or the plot to include the information from each parsed file.

In step 540, the user interface may receive a term sheet template and communicate the term sheet template to the document overwriting application.

In step 550, the overwriting application may generate a deconstruction of the term sheet template into the XML. The deconstruction may further include deconstructing the open-format file version of the precedent term sheet and isolate text occurrences. Likewise, the process may include splitting the XML content found in a new event document into formatting, text, and linker items. Splits may occur through identification of specific string patterns (linkers) used to separate text and formatting elements in XML. Both XML files (i.e., new, and precedent deals) may be parsed for information that requires overwriting. For instance, both XML files may be parsed for tags/values relevant for text overwriting (e.g., those related to SEC registered principal protected notes). This data is retrieved from the XML file based on a set list of XML tags. Tags may be retrieved as string values and an old-to-new value mapping may be generated.

In step 560, text may be generated by an artificial intelligence model executed by one or more processors, in operable communication or as a part of the document overwriting application, from the deconstruction. Text elements and old-to-new value maps may be provided as input to a natural language processing model for value replacement. The natural language processing model scans each text element and swap any old value for the corresponding new one, using the old-to-new value map as a guide. The natural language processing model may be trained based on a history of value replacements. The open-format file content may be reconstructed after the new value is swapped for the old value. Content reconstruction occurs by assembling string representations of the updated text, original formatting, and original linker elements back together in the original order. In some embodiments, original formatting may include adding punctuation such as commas, semicolons, dashes, font, color, or periods. Linker elements may describe links between resources (e.g., document, external, executables).

In step 570, the overwriting application may aggregate the text from the artificial intelligence model and the one or more of the script, table, and/or plot to generate a final term sheet.

Figure 6:
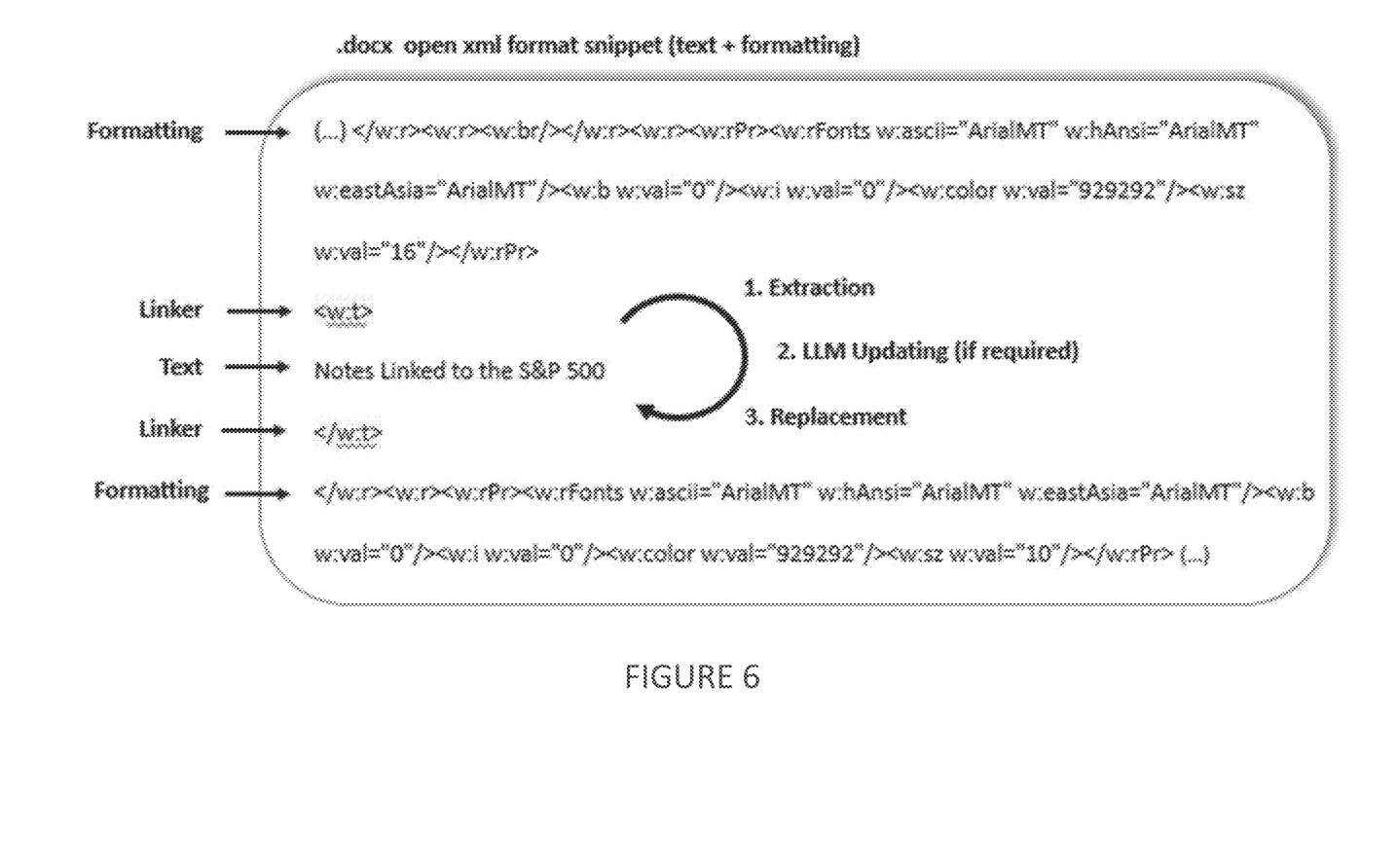
FIG. 6 illustrates a diagram illustrating text element update components, according to an embodiment.

FIG. 6 illustrates a diagram illustrating text element update components, according to some embodiments.

A table element update may be performed by the overwriting application executed by one or more processors. The update may be implemented systematically. A relevant table section from within the open-format file content may be identified and the identified table section may be deconstructed as described above with respect to text element updates. The relevant section may be identified with specific pre-set string patterns. The section may be identified by page, section (e.g., key terms or associated with a profile), a denotation, or a spacing. Table content may be treated as text elements for this second round of updating. The XML of the new deal may be parsed for table-relevant tags. Data may be retrieved and may be transformed using pre coded logic (e.g., logic specific to SEC registered principal protected note deal types). A deterministic value replacement may replace old table values with new ones in sequence through a deterministic approach. Table section and open-format file content reconstruction may occur by assembling strings representations of the updated text, original formatting and original linker elements back together in the original order.

As noted above, the overwriting application may also execute illustration element updates. An illustration element update process may parse the XML of the new deal for illustration relevant tags. Data may be retrieved and may be transformed using pre-coded logic (e.g., specific to SEC registered principal protected note deal types). An illustration version of the data may be used to generate an image. The formatting and styling of each illustration may be manually encoded in the tool, so it adheres to the visual expectation of the final documents. The image version of the illustration is saved in the appropriate folder of the unzipped version of the word processor document. The new image may be saved in the same location and under the same name of the one it is replacing. During the reconstruction of the final term sheet, images may be automatically embedded in the document using an approach that depends on imagine location and name.

Figure 7:
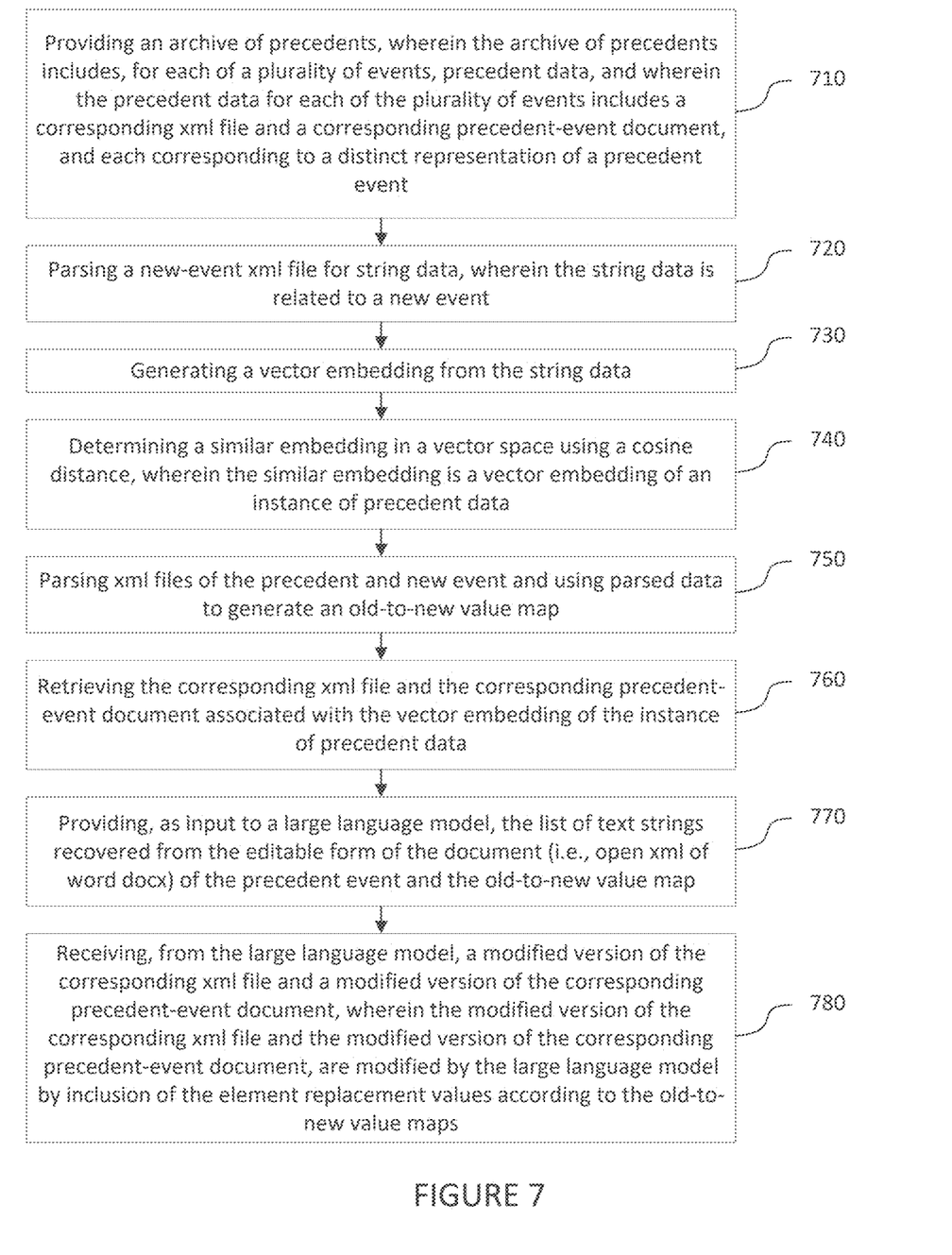
FIG. 7 illustrates a logical flow for generating document formatting and content, according to an embodiment.

Referring to FIG. 7, a logical flow for generating document formatting and content according to some embodiments is illustrated.

Step 710 includes providing, by a database manager executed by one or more processors, an archive of precedents, wherein the archive of precedents includes, for each of a plurality of events, precedent data, and wherein the precedent data for each of the plurality of events includes a corresponding XML file and a corresponding precedent-event document. In some embodiments, the archive of precedents may be indexed by subject, by a party, by a type of currency, and/or by an attribute of a party (e.g., city, country, date, country of origin). The database manager may be operably connected to a memory such as a hard drive, a cloud-based memory, or a network memory to store the archive of precedents and/or an associated index.

Step 720 includes, by an overwriting application executed by one or more processors and in operable communication with the database manager, parsing a new-event XML file for string data, wherein the string data is related to a new event.

Step 730 includes, by the overwriting application, generating a vector embedding from the string data.

Step 740 includes, by the overwriting application, determining a similar embedding in a vector space using a similarity measurement, wherein the similar embedding is a vector embedding of an instance of precedent data. The similar embedding may include an embedding of corresponding parsed xml string data; where similarity corresponds to the cosine distance of vector embeddings within the embedding space or cross encoder prediction using vector embeddings; cosine distance is calculated as 1 minus the cosine similarity between two vectors (i.e., that a lower cosine distance score indicates higher similarity between two vectors). Cross encoder predicts a value between 0 and 1, where lower values indicate higher similarity.

Step 750 includes, by the overwriting application. preparing input to a natural language processing model. This step further includes parsing XML files of the precedent and new event and using parsed data to generate an old-to-new value map. The precedent document is converted into a word processor document format (e.g., .docx format) if one is not available, and then unzipped for access to an editable form of the document (which may also be in XML format. The editable form of the document may be further parsed for text elements, which are recovered as a list of strings. A parsing strategy, as discussed above, may be executed, wherein anything identified between linkers is considered a string text element to be appended to the list.

Step 760 includes, by the overwriting application calling to the database manager, retrieving the corresponding XML file and the corresponding precedent-event document associated with the vector embedding of the instance of precedent data.

Step 770 includes providing, by the overwriting application, as input to a natural language processing model, the list of text strings recovered from the editable form of the document (i.e., open xml of word docx) of the precedent event and the old-to-new value map.

Step 780 includes, by the overwriting application, receiving, from the natural language processing model, a modified version of the corresponding XML file and a modified version of the corresponding precedent-event document, wherein the modified version of the corresponding XML file and the modified version of the corresponding precedent-event document, are modified by the natural language processing model by inclusion of the element replacement values according to the old-to-new value maps. That is, the natural language processing model scans each text string for the list of text strings provided and replaces any old value of the old-to-new value map with the corresponding new value, adopting the format of the text string consistent with embodiments disclosed herein. For instance, "2023-01-01" may be changed to "2023-12-12" by the natural language processing model. Then the natural language processing model would be able to identify "the 1st of January 2023" to "the 12th of December 2023". The natural language processing model returns a list of string text elements (updated where appropriate) in the same order of the original, such that these can be sequentially added to the original editable form of the document in the right place. Text replacement occurs via programmatic string/substring manipulation.

Figure 8:
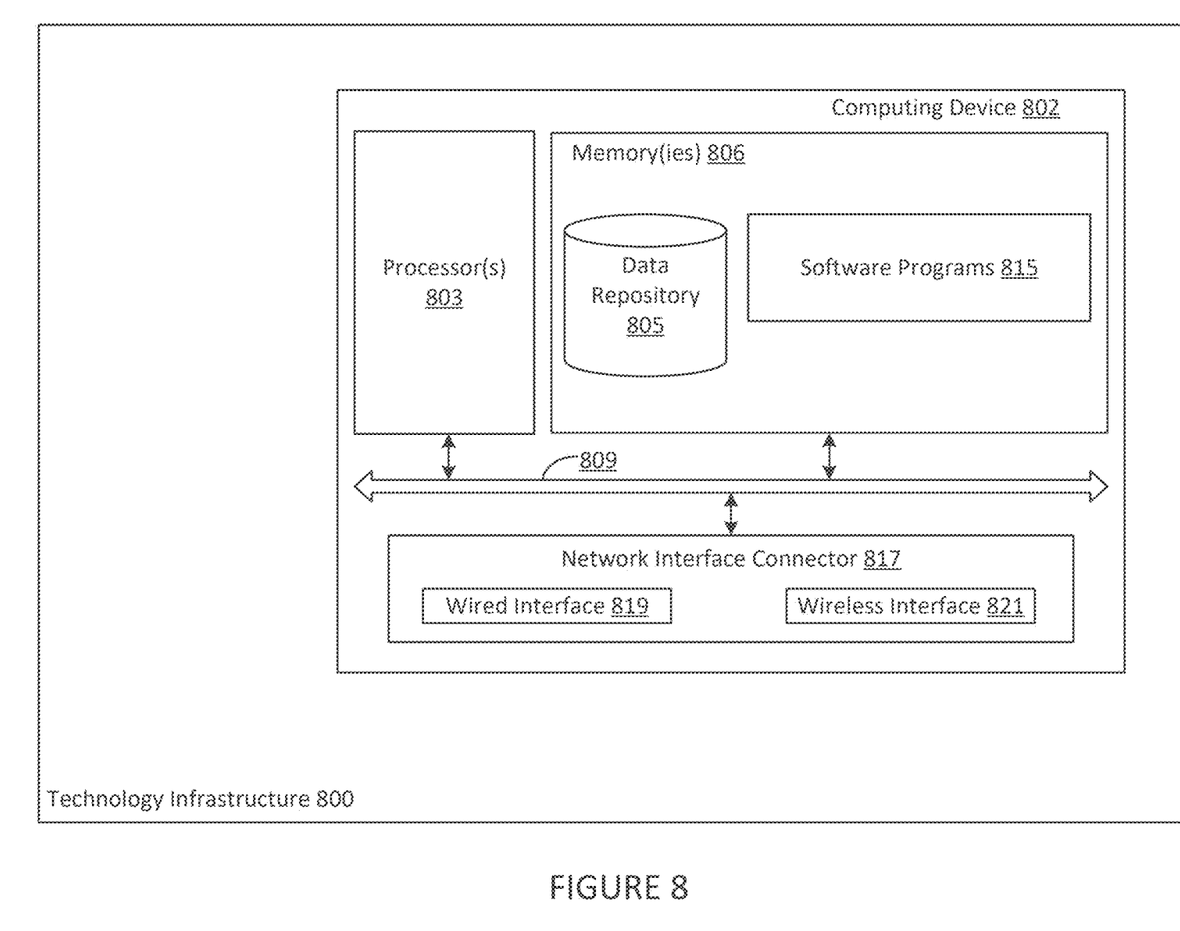
FIG. 8 illustrates a block diagram of a technology infrastructure and computing device for implementing certain Embodiments of the present disclosure, according to an embodiment.

FIG. 8 illustrates a block diagram of a technology infrastructure and computing device for implementing certain Embodiments of the present disclosure according to some embodiments. FIG. 8 includes technology infrastructure 800. Technology infrastructure 800 represents the technology infrastructure of an implementing organization. Technology infrastructure 800 may include hardware such as servers, client devices, and other computers or processing devices. Technology infrastructure 800 may include software (e.g., computer) applications that execute on computers and other processing devices. Technology infrastructure 800 may include computer network mediums, and computer networking hardware and software for providing operative communication between computers, processing devices, software applications, procedures and processes, and logical flows and steps, as described herein.

Hardware and software may be implemented in combination where software (such as a computer application, database manager, overwriting application) executes on hardware. For instance, technology infrastructure 800 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 800 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device. The graphical user interface may be configured to display results of any of the steps discussed herein, or to present information to the user which is valuable for making edits to the generated document (e.g. figures, text, tables). The graphical user interface may also be used in allowing for user-based control through the specification of manually selected precedent information, which may bypass the precedent selection step. For example, when deterministic values are identified in the XML for certain deal types (e.g. Phoenix Autocallable), the UI presents a set of dates which are used to overwrite the dates section easily by the document editing teams downstream. The set of dates may be used by a computer application to overwrite the dates section. Similarly, other examples of information used to overwrite may include the specification of APIs used to obtain tabular or figure information.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 800 may include network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper or fiber optic wire/cable) that forms a physical computer network. Routers, switches, and firewalls may also have "wireless" interfaces that facilitate data transmissions via radio waves. A computer network included in technology infrastructure 800 may include both wired and wireless components and interfaces and may interface with servers and other hardware via either wired or wireless communications. A computer network of technology infrastructure 800 may be a private network but may interface with a public network (such as the internet) to facilitate operative communication between computers executing on technology infrastructure 800 and computers executing outside of technology infrastructure 800.

FIG. 8 further depicts a computing device 802. Computing device 802 depicts hardware that executes the logic that drives the various system components described herein. Servers and client devices may take the form of computing device 802. While shown as internal to technology infrastructure 800, computing device 802 may be external to technology infrastructure 800 and may be in operative communication with a computing device internal to technology infrastructure 800.

System components such as client devices, servers, various database engines and database services, and other computer applications and logic may include, and/or execute on, components and configurations the same, or similar to, computing device 802.

Computing device 802 includes a processor 803 coupled to a memory 806. Memory 806 may include volatile memory and/or persistent memory. The processor 803 executes computer-executable program code stored in memory 806, such as software programs 815. Software programs 815 may include one or more of the logical steps disclosed herein as a programmatic instruction, which can be executed by processor 803. Memory 806 may also include data repository 805, which may be nonvolatile memory for data persistence. The processor 803 and the memory 806 may be coupled by a bus 809. In some examples, the bus 809 may also be coupled to one or more network interface connectors 817, such as wired network interface 819, and/or wireless network interface 821. Computing device 802 may also have user interface components, such as a screen for displaying graphical user interfaces and receiving input from the user, a mouse, a keyboard and/or other input/output components (not shown).

Services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some Embodiments, API access may be governed by an API gateway associated with a corresponding API. In some Embodiments, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of this disclosure or portions of the system may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one Embodiment, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement this disclosure may utilize a suitable operating system, and instructions may come directly or indirectly from the operating system.

The processing device used to implement this disclosure may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes.

It is appreciated that in order to practice the method as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further Embodiment of this disclosure, be performed by a single component. Further, the processing performed by one distinct component as described above may be performed by two distinct components. In a similar manner, the memory storage performed by two distinct memory portions as described above may, in accordance with a further Embodiment of this disclosure, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of this disclosure. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of this disclosure may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various Embodiments of this disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desirable.

Also, the instructions and/or data used in the practice of this disclosure may utilize any compression or encryption technique or algorithm, as may be desired. An encryption module might be used to encrypt data. Further, files or other data may be decrypted using a suitable decryption module, for example.

As described above, this disclosure may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method, a variety of "user interfaces" may be utilized to allow a user to interface with the processing device or machines. As used herein, a user interface may include any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some Embodiments of the system and method of this disclosure, it is not necessary that a human user actually interact with a user interface used by the processing device. Rather, it is also contemplated that the user interface might interact, i.e., convey and receive information, with another processing device, rather than a human user. Accordingly, the other processing device might be characterized as a user. Further, it is contemplated that a user interface utilized in the system and method may interact partially with another processing device or processing devices, while also interacting partially with a human user.

It will be readily understood by those persons skilled in the art that this disclosure is susceptible to broad utility and application. Many Embodiments and adaptations other than those herein described, as well as many variations, modifications, and equivalent arrangements, will be apparent from or reasonably suggested by this disclosure and foregoing description thereof, without departing from the substance or scope herein.

Accordingly, while this disclosure has been described in detail in relation to its exemplary Embodiments, it is to be understood that this disclosure is only illustrative and exemplary and is made to provide an enabling disclosure. Accordingly, the foregoing disclosure is not intended to be construed or to limit or otherwise to exclude any other such Embodiments, adaptations, variations, modifications, or equivalent arrangements.

The invention claimed is:

1. A method comprising:
    providing, by a database manager executed by one or more processors, an archive of precedents, wherein the archive of precedents includes, for each of a plurality of events, precedent data, and wherein the precedent data for each of the plurality of events includes a corresponding open-format file and a corresponding precedent-event document, and each corresponding to a distinct representation of a precedent event;
    parsing, by an overwriting application executed by one or more processors, a new-event open-format file for string data, wherein the string data is related to a new event;
    generating, by the overwriting application, a vector embedding from the string data;
    determining, by the overwriting application, a similar embedding in a vector space using a cosine distance wherein the similar embedding is a vector embedding or representation of an instance of precedent data;
    parsing, by the overwriting application, open-format files of the precedent and new event and using parsed data to generate an old-to-new value map;
    retrieving, by the overwriting application, the corresponding open-format file and the corresponding precedent-event document(s) associated with the vector embedding of the instance of precedent data;
    providing, by the overwriting application, as input to a natural language processing model, the list of text strings recovered from the editable form of the document of the precedent event and the old-to-new value map;
    modifying, by the natural language processing model executed by one or more processors, the corresponding open-format file and the corresponding precedent-event document by including element replacement values according to the old-to-new value maps, and
    receiving, by a user interface through the overwriting application and from the natural language processing model, a modified version of the corresponding open-format file and a modified version of the corresponding precedent-event document.

2. The method of claim 1, comprising:
    saving the modified version of the corresponding open-format file and the modified version of the corresponding precedent-event document as a new open-format file and a new event document, respectively.

3. The method of claim 2, comprising:
    adding the new open-format file and the new event document as precedent data to the archive of precedents.

4. The method of claim 1, wherein the element replacement values include a text element update.

5. The method of claim 1, wherein the element replacement values include a table element update.

6. The method of claim 1, wherein the element replacement values include an illustration element update.

7. A system comprising at least one computer including a processor and a memory, wherein the at least one computer is configured to:
    provide, by a database manager executed by one or more processors, an archive of precedents, wherein the archive of precedents includes, for each of a plurality of events, precedent data, and wherein the precedent data for each of the plurality of events includes a corresponding open-format file and a corresponding precedent-event document, and each corresponding to a distinct representation of a precedent event;
    parse, by an overwriting application executed by one or more processors, a new-event open-format file for string data, wherein the string data is related to a new event;
    generate, by the overwriting application, a vector embedding from the string data;
    determine, by the overwriting application, a similar embedding in a vector space using a cosine distance wherein the similar embedding is a vector embedding or representation of an instance of precedent data;
    parse, by the overwriting application, open-format files of the precedent and new event and using parsed data to generate an old-to-new value map;
    retrieve, by the overwriting application, the corresponding open-format file and the corresponding precedent-event document(s) associated with the vector embedding of the instance of precedent data;
    provide, by the overwriting application, as input to a natural language processing model, the list of text strings recovered from the editable form of the document of the precedent event and the old-to-new value map;
    modify, by the natural language processing model executed by one or more processors, the corresponding open-format file and the corresponding precedent-event document by including element replacement values according to the old-to-new value maps, and
    receive, by a user interface through the overwriting application and from the natural language processing model, a modified version of the corresponding open-format file and a modified version of the corresponding precedent-event document.

8. The system of claim 7, wherein the at least one computer is configured to:
    save the modified version of the corresponding open-format file and the modified version of the corresponding precedent-event document as a new open-format file and a new event document, respectively.

9. The system of claim 8, wherein the at least one computer is configured to:
    add the new open-format file and the new event document as precedent data to the archive of precedents.

10. The system of claim 7, wherein the element replacement values include a text element update.

11. The system of claim 7, wherein the element replacement values include a table element update.

12. The system of claim 7, wherein the element replacement values include an illustration element update.

13. A method comprising:
- providing, by a database manager executed by one or more processors, an archive of precedents, wherein the archive of precedents includes, for each of a plurality of events, precedent data, and wherein the precedent data for each of the plurality of events includes a corresponding open-format file and a corresponding precedent-event document, and each corresponding to a distinct representation of a precedent event;
- parsing, by an overwriting application executed by one or more processors, a new-event open-format file for string data, wherein the string data is related to a new event;
- generating, by the overwriting application, a vector embedding from the string data;
- determining, by the overwriting application, a similar embedding in a vector space using an output of a cross encoder model, wherein the similar embedding is a vector embedding or representation of an instance of precedent data;
- parsing, by the overwriting application, open-format files of the precedent and new event and using parsed data to generate an old-to-new value map;
- retrieving, by the overwriting application, the corresponding open-format file and the corresponding precedent-event document(s) associated with the vector embedding of the instance of precedent data;
- providing, by the overwriting application, as input to a natural language processing model, the list of text strings recovered from the editable form of the document of the precedent event and the old-to-new value map;
- modifying, by the natural language processing model executed by one or more processors, the corresponding open-format file and the corresponding precedent-event document by including element replacement values according to the old-to-new value maps, and
- receiving, by a user interface through the overwriting application and from the natural language processing model, a modified version of the corresponding open-format file and a modified version of the corresponding precedent-event document.

* * * * *